US005497810A

United States Patent [19]

Berger et al.

[11] Patent Number: 5,497,810
[45] Date of Patent: Mar. 12, 1996

[54] HOSE ASSEMBLY AND METHOD OF MAKING THE SAME

[75] Inventors: Jeffrey M. Berger, Springfield; Randy C. Foster, Strafford, both of Mo.

[73] Assignee: Dayco Products, Inc., Dayton, Ohio

[21] Appl. No.: 350,762

[22] Filed: Dec. 6, 1994

Related U.S. Application Data

[62] Division of Ser. No. 58,625, May 6, 1993, Pat. No. 5,398,977.

[51] Int. Cl.⁶ .................................................. F16L 39/04
[52] U.S. Cl. .......................... 138/113; 138/108; 138/114
[58] Field of Search ................................... 138/108, 111, 138/113, 114, 148, 121, 122; 141/59, 392, 44

[56] References Cited

U.S. PATENT DOCUMENTS

| | | | |
|---|---|---|---|
| 3,974,862 | 8/1976 | Führmann | 138/114 |
| 4,274,549 | 6/1981 | Germain | 138/113 |
| 4,377,545 | 3/1983 | Hornbeck | 138/114 |
| 4,521,038 | 6/1985 | Cerny | 138/114 |
| 4,951,720 | 8/1990 | Grantham | 141/59 |
| 5,056,569 | 10/1991 | Walker et al. | 141/59 |
| 5,089,074 | 2/1992 | Winter et al. | 138/121 |
| 5,129,428 | 7/1992 | Winter et al. | 138/113 |
| 5,129,686 | 7/1992 | Sanders et al. | 138/121 |
| 5,156,191 | 10/1992 | Walker et al. | 138/113 |
| 5,203,378 | 4/1993 | Williams | 138/113 |
| 5,285,744 | 2/1994 | Grantham et al. | 138/113 |
| 5,343,734 | 9/1994 | Skaggs | 138/114 |
| 5,358,358 | 10/1994 | Tassone et al. | 138/113 |

*Primary Examiner*—James E. Bryant, III
*Attorney, Agent, or Firm*—Joseph V. Tassone

[57] ABSTRACT

A hose assembly having opposite ends and having a first fluid passage therein for conveying a volatile liquid in one direction from one of the ends thereof to a container adjacent the other of the ends thereof and a second fluid passage therein for returning the vapors of the volatile liquid fuel from the container to the one end thereof, the assembly comprising a flexible inner hose having an outer peripheral surface and defining one of the fluid passages therein, a flexible outer hose having an inner peripheral surface and an outer peripheral surface and being disposed around the inner hose, the inner peripheral surface of the outer hose and the outer peripheral surface of the inner hose defining the other of the fluid passages therebetween, the outer hose comprising a corrugated tube that has the corrugations thereof extending throughout the entire length thereof, and a cuff secured to one of the ends of the outer hose, the cuff covering the inner peripheral surface and the outer peripheral surface of that end of the outer hose that is secured thereto.

8 Claims, 5 Drawing Sheets

HOSE ASSEMBLY AND METHOD OF MAKING THE SAME

This application is a divisional patent application of its copending parent patent application, Ser. No. 058,625, filed May 6, 1993, now U.S. Pat. No. 5,398,977.

BACKGROUND OF THE INVENTION

1. Field of the Invention

This invention relates to a new hose assembly and to a new method of making the hose assembly.

2. Prior Art Statement

It is known to provide a hose assembly having opposite ends and having a first fluid passage therein for conveying a volatile liquid fuel in one direction from one of the ends thereof to a container adjacent the other of the ends thereof and a second fluid passage therein for returning the vapors of volatile liquid fuel from the container to the one end thereof, the assembly comprising a flexible inner hose having an outer peripheral surface and defining one of the fluid passages therein, a flexible outer hose having an inner peripheral surface and an outer peripheral surface and being disposed around the inner hose, the inner peripheral surface of the outer hose and the outer peripheral surface of the inner hose defining the other of the fluid passages therebetween, the outer hose comprising a corrugated tube that has the corrugations thereof extending throughout the entire length thereof, and a cuff secured to one of the ends of the outer hose. For example, see the U.S. patent to Grantham, U.S. Pat. No. 4,951,720.

It is also known to provide a flexible hose construction that comprises a corrugated tube that has the corrugations thereof extending throughout the entire length thereof with the outer peripheral surface of the hose comprising a substantially straight line tubular layer of polymeric material secured to the corrugations of the corrugated tube throughout the entire length thereof with the inner peripheral surface of the hose comprising the corrugated tube. For example, see the U. S. patent to Winter et al, U.S. Pat. No. 5,089,074.

It is also known to secure a coupling structure in various manners to the hose of the aforementioned U. S. patent to Winter et al, U.S. Pat. No. 5,089,074. For example, see the U.S. patent to Sanders et al, U.S. Pat. No. 5,129,686.

SUMMARY OF THE INVENTION

It is one of the features of this invention to provide a new flexible hose assembly for a vapor recovery purpose and for a volatile liquid fuel delivery purpose and wherein the outer hose of the hose assembly is unique.

In particular, it is believed according to the teachings of this invention that when the inner hose of the hose assembly is being utilized for volatile liquid fuel delivery in one direction and the fluid passage between the inner hose and the outer hose is being utilized for returning the vapors of the volatile liquid fuel in the opposite direction as set forth in the aforementioned U.S. patent to Grantham, U.S. Pat. No. 4,952,720, the outer hose can comprise a corrugated tube formed of polymeric material and in the manner of the corrugated tube of the aforementioned patent to Winter et al, U.S. Pat. No. 5,089,074 without having the additional layers of polymeric material disposed on that corrugated tube as further disclosed in the aforementioned patent to Winter et al, U.S. Pat. No. 5,089,074.

In contrast, it is further believed according to the teachings of this invention that when the hose assembly is being utilized for an active vapor recovery system wherein the inner hose of the assembly is being utilized for returning vapors of the volatile liquid in one direction and the passage between the outer hose and the inner hose is being utilized for delivering the volatile liquid fuel in the opposite direction, the outer hose can comprise the completed hose assembly of the aforementioned patent to Winter et al, U.S. Pat. No. 5,089,074 wherein the same comprises a corrugated tube that has the corrugations thereof extending throughout the entire length thereof and having an outer peripheral surface means thereof comprising a substantially straight line tubular layer of polymeric material secured to the corrugations of the corrugated tube throughout the entire length thereof and with the inner peripheral surface means of the outer hose comprising the corrugated tube.

It is also believed according to the teachings of this invention that regardless of the type of outer hose of this invention as previously described, a cuff can be secured to one of the ends of that outer hose with that cuff covering the inner peripheral surface means and the outer peripheral surface means of that end of the outer hose to readily permit that hose assembly to be secured to a coupling structure at that end of the outer hose, such coupling structure being any suitable coupling structure, such as the coupling structure set forth in the aforementioned U.S. patent to Grantham, U.S. Pat. No. 4,951,720 or a modified coupling structure of the type set forth in the aforementioned patent to Sanders et al, U.S. Pat. No. 5,129,686.

Accordingly, one embodiment of this invention comprises a hose assembly having opposite ends and having a first fluid passage therein for conveying a volatile fuel in one direction from one of the ends thereof to a container adjacent the other of the ends thereof and a second fluid passage therein for returning the vapors of the volatile liquid fuel from the container to the one end thereof, the assembly comprising a flexible inner hose having an outer peripheral surface and defining one of the fluid passages therein, a flexible outer hose having an inner peripheral surface and an outer peripheral surface and being disposed around the inner hose, the inner peripheral surface of the outer hose and the outer peripheral surface of the inner hose defining the other of the fluid passages therebetween, the outer hose comprising a corrugated tube that has the corrugations thereof extending throughout the entire length thereof and a cuff secured to one of the ends of the outer hose, the cuff covering the inner peripheral surface and the outer peripheral surface of that end of the outer hose that is secured thereto.

Thus, it is an object of this invention to provide a new hose assembly having one or more of the novel features of this invention as set forth above or hereinafter shown or described.

Another object of this invention is to provide a new method of making such a hose assembly, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a schematic side view of the hose assembly of this invention being utilized for dispensing gasoline from a conventional curbside gasoline pump or the like to a dispensing nozzle means for insertion in the gasoline tank of a transportation vehicle or the like.

DESCRIPTION OF THE PREFERRED EMBODIMENTS

Figure 1:
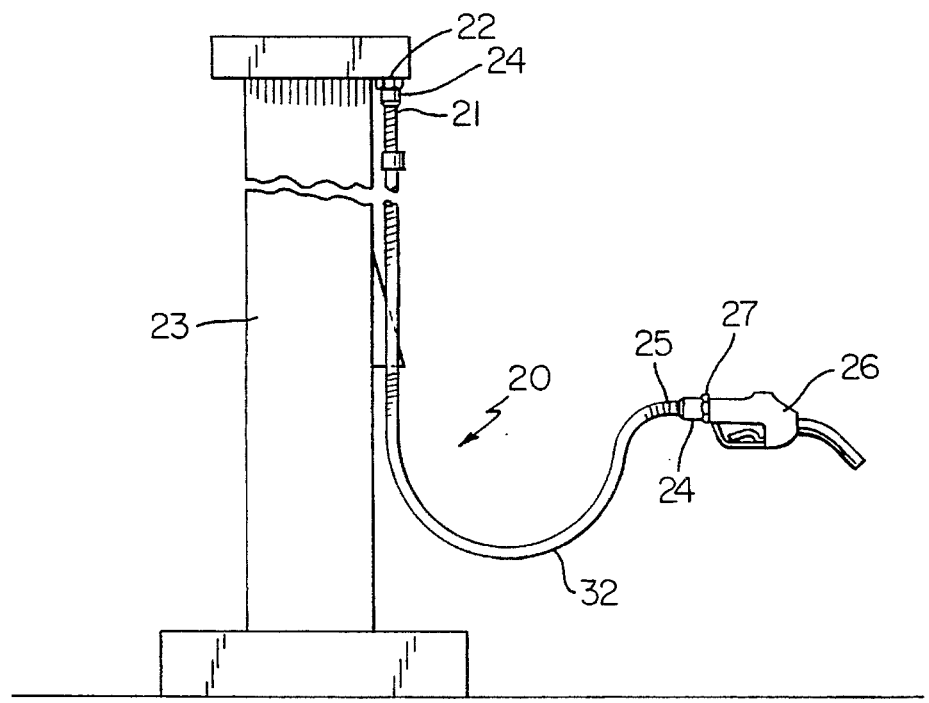

While the various features of this invention are hereinafter illustrated and described as being particularly adapted to provide hose assemblies for fuel dispensing systems, such as for gasoline for transportation vehicles, it is to be understood that the various features of this invention can be utilized singly or in various combinations thereof to provide a hose assembly for a dispensing system for other fluids as desired.

Therefore, this invention is not to be limited to only the embodiments illustrated in the drawings, because the drawings are merely utilized to illustrate one of the wide variety of uses of this invention.

Referring now to FIG. 1, the new hose assembly of this invention is generally indicated by the reference numeral 20 and is shown in FIG. 1 as having one end 21 thereof interconnected to an outlet means 22 of a gasoline pump 23 or the like by coupling structure 24 secured to the end 21 of the hose assembly 20 and threaded into the outlet means 22. The hose assembly 20 has the other end 25 thereof interconnected to a dispensing nozzle construction 26 by having the coupling structure 24 that is interconnected to the end 25 of the hose assembly 20 threaded into a inlet means 27 of the nozzle construction 26 in a manner well known in the art. For example, see the aforementioned U.S. patent to Grantham, U.S. Pat. No. 4,951,720, whereby this U.S. patent is being incorporated into this disclosure by this reference thereto.

Figure 2:
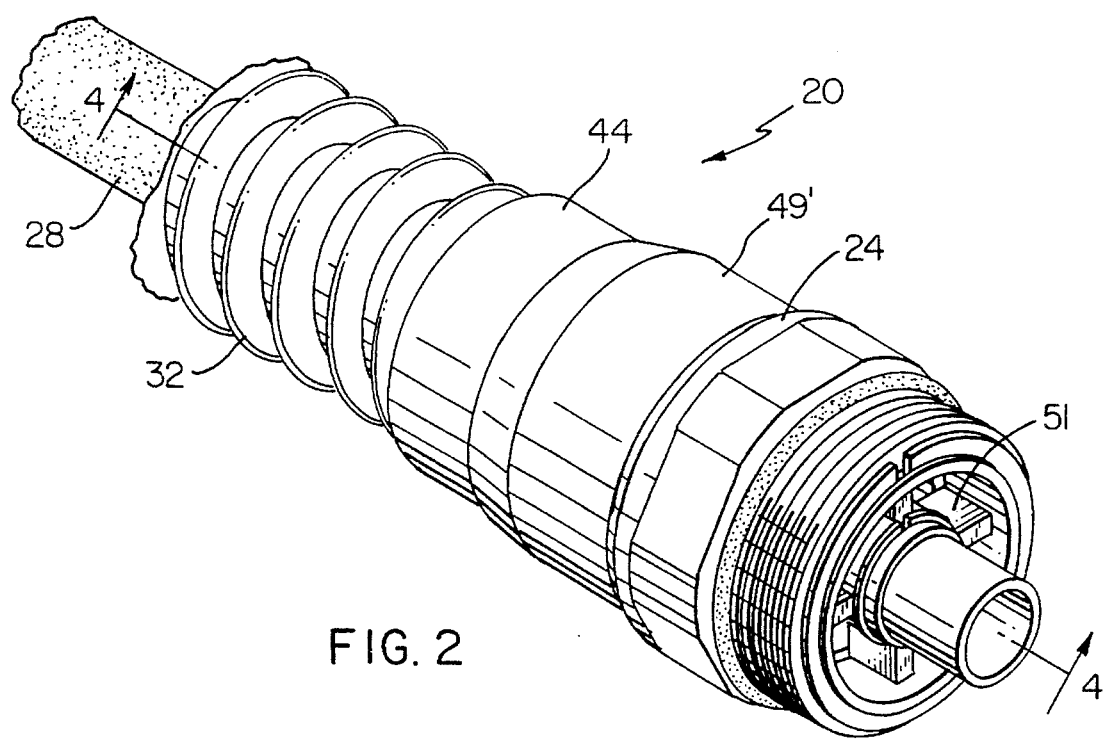
FIG. 2 is an enlarged fragmentary perspective view of one end of the hose assembly of FIG. 1.
Figure 3:
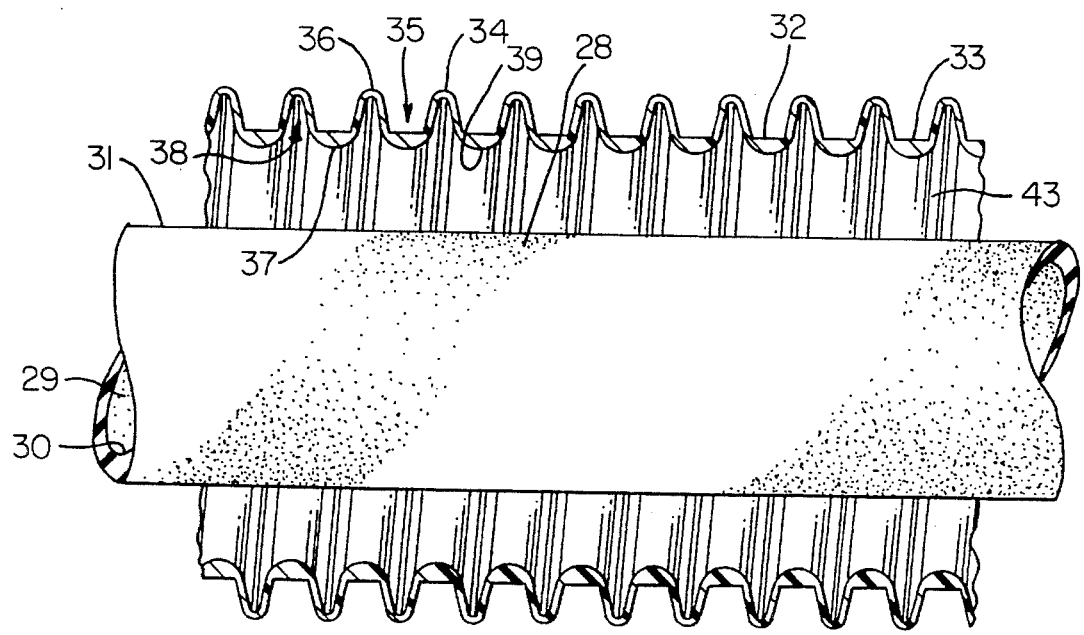
FIG. 3 is an enlarged fragmentary cross-sectional view illustrating the inner and outer hoses of the hose assembly of FIG. 2.
Figure 4:
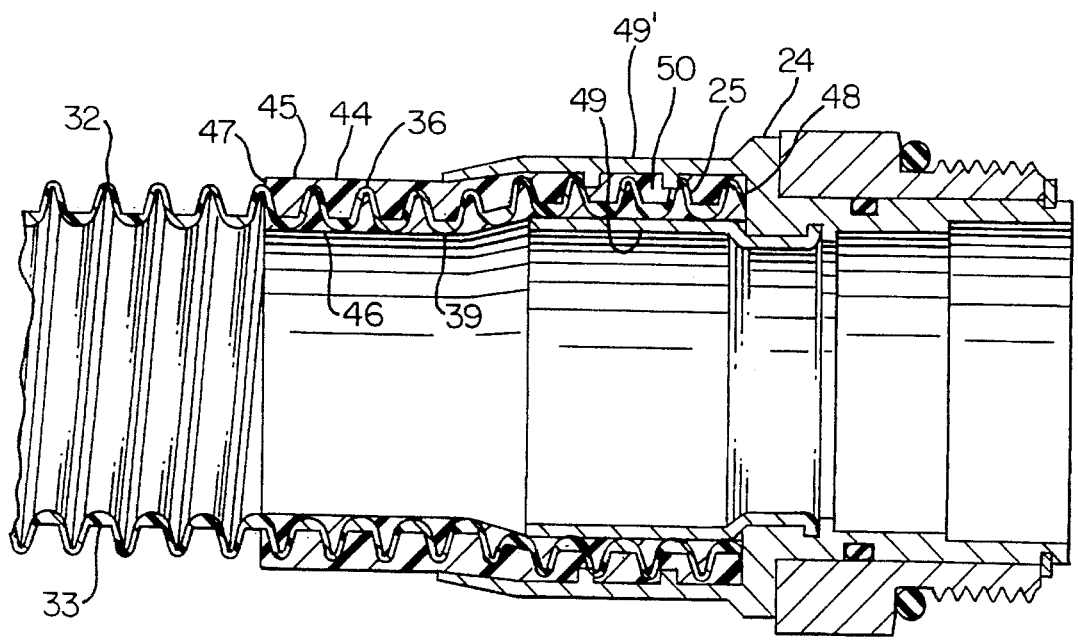
FIG. 4 is an enlarged fragmentary cross-sectional view taken on line 4—4 of FIG. 2 and with the inner hose removed.

As illustrated in FIGS. 2–4, the hose assembly 20 comprises a flexible inner hose 28 made mainly of polymeric material and having a passage 29 therethrough that defines an inner peripheral surface means 30 thereof, the inner hose 28 having an outer peripheral surface means 31 with the peripheral surface means 30 and 31 respectively being relatively smooth. However, it is to be understood that the inner hose 28 can have an inner corrugated surface means with a smooth or corrugated exterior surface means 31 or can have a corrugated exterior means 31 with a smooth or corrugated interior surface means 30, as desired.

In any event, the hose assembly 20 illustrated in FIGS. 2–4 has a flexible outer hose 32 that comprises a corrugated tube 33 of polymeric material and being of the type set forth in the aforementioned U.S. patent to Winter et al, U.S. Pat. No. 5,089,074, whereby this patent is also being incorporated into this disclosure by this reference thereto.

The tube 33 has a plurality of exterior convex corrugations 34 with valleys 35 therebetween with the corrugations 34 and valleys 35 defining the exterior peripheral surface 36 of the outer hose 32. Similarly, the tube 33 has a plurality of interior convex corrugations 37 with valleys 38 therebetween whereby the interior corrugations 37 and valleys 38 define the interior peripheral surface means 39 of the outer hose 32.

It can be seen that the corrugations 36 and 37 of the tube 33 completely extend throughout the entire length of the hose assembly 20 from the end 21 thereof to the end 25 thereof and are respectively helically disposed so as to be particularly advantageous when cooperating with a venturi means that would be disposed in the inner hose 31 for the reasons fully set forth in the U.S. patent to Walker et al, U.S. Pat. No. 5,056,569, whereby this patent is also being incorporated into this disclosure by this reference thereto.

However, it is to be understood that the tube 33 could have the corrugations thereof annularly disposed rather than helically disposed as illustrated in FIGS. 1–4.

Figure 10:
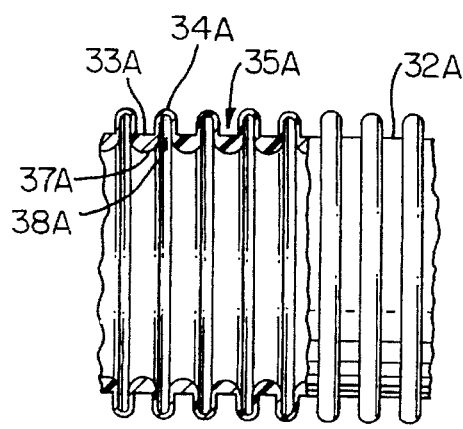
FIG. 10 is a fragmentary cross-sectional view of another outer hose of this invention that can be utilized for the outer hose of the hose assembly illustrated in FIG. 3.

For example, another outer hose of this invention is generally indicated by the reference numeral 32A in FIG. 10 and parts thereof similar to the parts of the outer hose 32 previously described are indicated by like reference numerals followed by the reference letter "A".

As illustrated in FIG. 10, it can be seen that the tube 33A has the exterior corrugations 34A thereof and the exterior recesses 35A thereof annularly disposed whereby the interior corrugations 37A and the interior recesses 38A are likewise annularly disposed, such annular arrangement also being fully disclosed in the aforementioned U.S. patent to Winter et al, U.S. Pat. No. 5,089,074.

Figure 9:
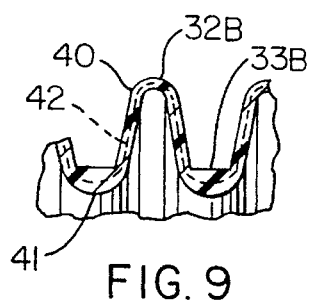
FIG. 9 is an enlarged fragmentary cross-sectional view of another outer hose for a hose assembly of this invention.

Also, it is to be understood that while the tubes 33 and 33A can be formed of any suitable polymeric material, the same can each be formed of at least two different layers of polymeric material such as illustrated in FIG. 9 wherein another outer hose of this invention is indicated by the reference numeral 32B and parts thereof similar to the parts of the hoses 32 or 32A previously described are indicated by like reference numerals followed by the reference numeral "B".

As illustrated in FIG. 9, the hose 32B has an outer layer of polymeric material 40 and an inner layer of polymeric material 41 bonded together as illustrated by a dashed inner face line 42, the tube 33B being formed in any suitable manner, such as by blow molding as fully set forth in the aforementioned patent to Winter et al, U.S. Pat. No. 5,089,074, with the inner layer 41 being particularly adapted to prevent volatile liquid fuels, such as gasoline, from permeating therethrough.

Therefore, it is believed that the hose assembly 20 of this invention as illustrated in FIG. 3 can have an outer passage 43 that is defined between the external peripheral surface means 31 of the inner hose 28 and the internal peripheral surface means 39 of the outer hose 32 be utilized for either conveying the vapors of the volatile liquid back from the nozzle 26 to the pump means 23 while the inner passage 29 of the inner hose 28 conveys fuel from the pump means 23 to the nozzle 26 or the outer passage 43 can be utilized for conveying fuel from the pump means 23 to the nozzle 26 while the inner passage 29 of the inner hose 28 conveys vapors of the volatile liquid fuel back from the nozzle 26 to the pump means 23.

However, because a curbside hose assembly 20 as illustrated in FIG. 1 has the outer hose thereof subject to excessive abuse at the curbside location, it is presently believed that the outer hose of the hose assembly when being utilized for having the liquid fuel conveyed through the outer passage of the outer hose be of the type hereinafter described for FIGS. 5–8 and 11.

Therefore, it can be seen that the outer hose 32, 32A or 32B for the hose assembly 20 can be of the various constructions and materials that are set forth in the aforementioned U.S. patent to Winter et al, U.S. Pat. No. 5,089,074, and merely have the dimensions thereof, such as the inside diameter and the outside diameter as well as the spacing of the various corrugations thereof changed as desired to adapt the use of such a hose to the fuel dispensing and vapor recovering operations for the reasons and purposes fully set forth in the aforementioned U.S. patent to Grantham, U.S. Pat. No. 4,951,720.

As illustrated in FIG. 4, the tube 33 of the outer hose 32 of the hose assembly 20 has a cuff 44 of any suitable polymeric material molded on each end 21 and 25 thereof so as to have the respective coupling 24 attached thereto and since such cuff 44 and the coupling 24 are identical at either end 21 or 25 of the hose assembly, FIG. 4 illustrates only the end 25 of the outer hose 32 with the understanding that the end 21 has a like cuff 44 and like coupling 24 attached thereto in the same manner.

The cuff 44 as illustrated in FIG. 4 has a smooth outer peripheral surface 45 and a smooth inner peripheral surface 46 that respectively cover the outer peripheral surface means 36 and the inner peripheral surface means 39 of the hose 32 from one end 47 of the cuff 44 to the other end 48 thereof as illustrated.

In this manner, an insert 49 of the coupling 24 can be radially outwardly expanded to compress a portion 50 of the cuff 44 against an external tubular part 49' of the coupling 24 as illustrated to fasten the coupling 24 to the cuff 44 all in the manner fully set forth in the aforementioned U.S. patent to Grantham, U.S. Pat. No. 4,951,720, whereby the details of the structure of the coupling 24 need not be further set forth. However, it can readily be seen in FIG. 2 that a spider-like holding member 51 that is also disclosed in the aforementioned U.S. patent to Grantham, U.S. Pat. No. 4,951,720, is utilized to hold the outer hose 32 and the inner hose 28 relatively concentric to each other at the coupling 24 so as to maintain the passage 43 open throughout the entire length of the hose assembly 20 for the reasons fully set forth in the aforementioned patent to Grantham, U.S. Pat. No. 4,951,720.

However, it is to be understood that other types of couplings can be utilized for the hose assembly 20 of this invention. For example, the coupling illustrated in FIG. 8 could be utilized therefor and such coupling will be hereinafter described.

Therefore, it can be seen that it is a relatively simple method of this invention to make the hose assembly 20 to have either the inner passage 29 thereof convey volatile liquid fuel therethrough or return the vapors of volatile liquid fuel there through while the outer passage 43 thereof either returns the vapors of the volatile liquid fuel therethrough or conveys the volatile liquid fuel therethrough as previously set forth.

Figure 5:
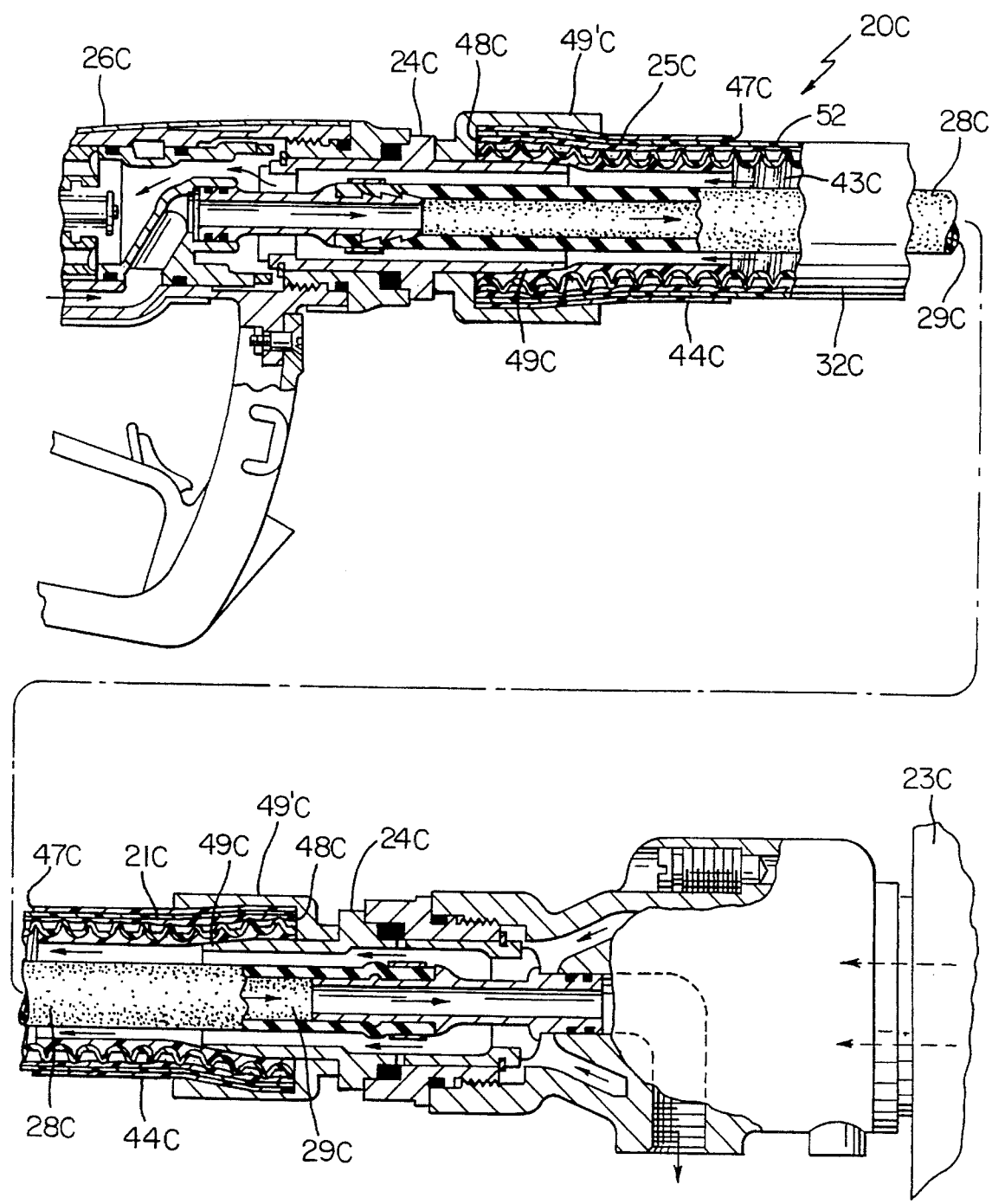
FIG. 5 is a fragmentary and broken away cross-sectional view of another hose assembly of this invention being utilized for interconnecting a fuel pump with a dispensing nozzle through an outer passage of the hose assembly and with the inner hose being utilized for returning vapors of the volatile liquid fuel therethrough.
Figure 6:
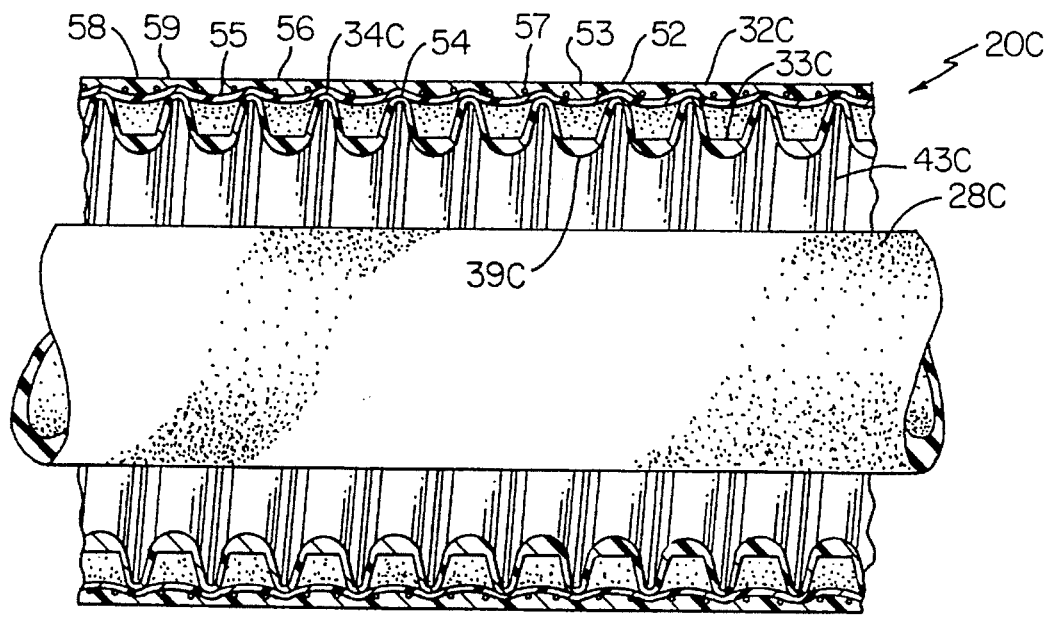
FIG. 6 is an enlarged fragmentary cross-sectional view of the inner and outer hoses of the hose assembly of FIG. 5.
Figure 7:
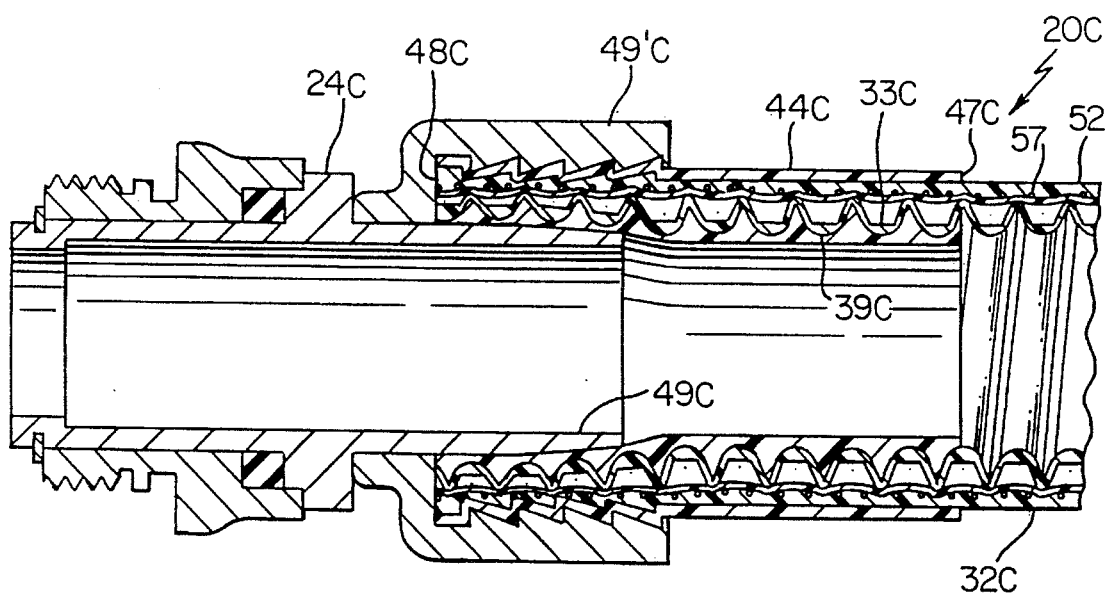
FIG. 7 is an enlarged fragmentary cross-sectional view taken on line 7—7 of FIG. 5 and with the inner hose thereof removed.

However, as previously stated another hose assembly of this invention is generally indicated by the reference numeral 20C in FIGS. 5–7 and parts thereof similar to the parts of the hose assemblies 20, 20A and 20B are indicated by like reference numerals followed by the reference letter "C".

As illustrated in FIG. 5, the hose assembly 20C has the opposite ends 21C and 25C thereof respectively interconnected to the coupling means 24C that, in turn, are interconnected to the fuel dispensing pump means 23C and the nozzle dispensing means 26C, the hose assembly 20C having the inner hose 28C with the inner passage 29C therethrough and the outer hose 32C cooperating with the inner hose 28C to define the outer passage 43C for the hose assembly 20C as previously described.

The particular fuel dispensing arrangement illustrated in FIG. 5 has the volatile liquid fuel passing from the pump means 23C to the dispensing nozzle 26C through the outer passage 43C of the hose assembly 20C while the vapors are returned through the inner passage 29C thereof. However, it is to be understood that the flow of fuel and vapors could be reversed as in the hose assembly 20, if desired.

In any event, it can be seen that the outer hose 32C of the hose assembly 20C as best illustrated in FIG. 6, has the corrugated member or tube 33C formed in the same manner as the tube 33 or 33B while having an outer layer of polymeric material 52 arranged in a substantially straight-line tubular arrangement 53 so as to be secured to the apexes 54 of the exterior convolutions 34C all in a manner fully disclosed in the aforementioned U.S. patent to Winter et al, U.S. Pat. No. 5,089,074. Thus, it can be seen that the polymeric layer 52 of the outer hose 32C actually comprises two layers 55 and 56 of two similar or dissimilar polymeric materials bonded together with a reinforcing layer 57, such as a woven braid of polymeric material, disposed therebetween and through which the outer layer 56 exudes to bond to the inner layer 55 to complete the polymeric layer 52 and thereby provide a relatively strong but flexible outer hose 32C for the hose assembly 20C.

The opposed ends 21C and 25C of the outer hose 32C have cuffs 44C of any suitable polymeric material secured thereto with the outer hose 32C extending completely through the cuff 44C to its opposed ends 47C and 48C to be sandwiched between cooperating members 49C and 49'C of the coupling 24C as illustrated in FIG. 7.

Thus, it can be seen that while the inner corrugated tube 33C forms the internal peripheral surface means 39C of the outer hose 32C, it is an outer peripheral surface 58 of the layer 52 of polymeric material that forms an outer peripheral surface means 59 of the outer hose 32C as illustrated in FIG. 6.

Accordingly, the cuff 44C is bonded both to the internal peripheral surface means 39C of the outer hose 32C as well as to the outer peripheral surface means 59 thereof as illustrated in FIG. 7.

Figure 11:
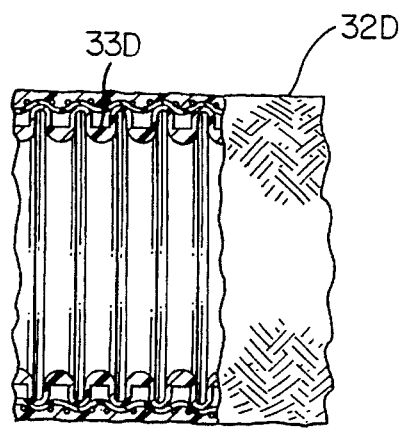
FIG. 11 is a fragmentary cross-sectional view of another outer hose of this invention that is similar to the outer hose of FIG. 8 without having a cuff secured thereto.

Also while the tubular member 33C of the outer hose 32C has the convolutions thereof helically disposed, the same could be annularly disposed as illustrated in FIG. 11 wherein another outer hose of this invention is indicated by the reference numeral 32D and parts thereof similar to the parts of the other outer hoses 32, 32A 32B and 32C of this invention are indicated by like reference numerals followed by the reference letter "D" even though such reference numerals are not further described.

Figure 8:
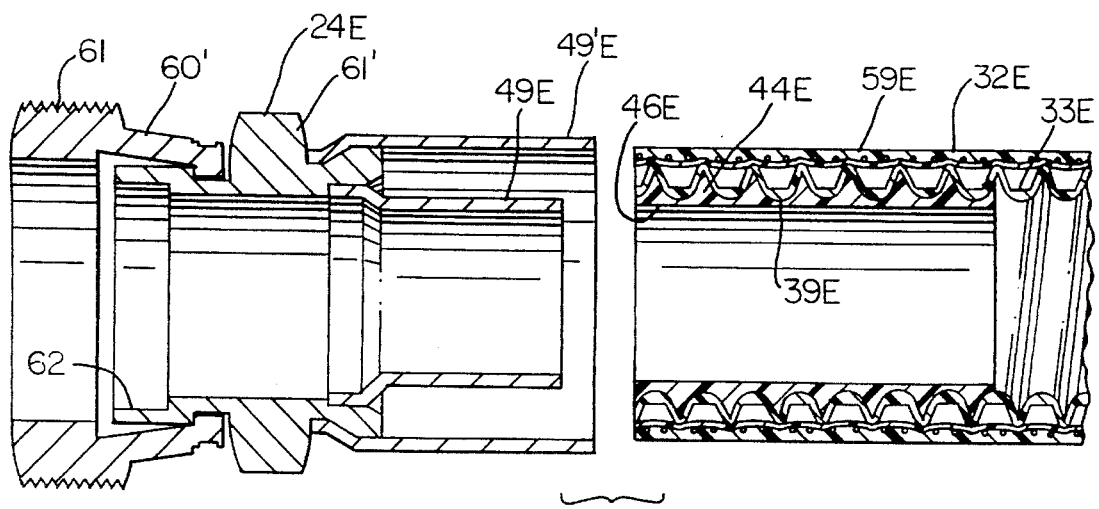
FIG. 8 is an exploded fragmentary cross-sectional view illustrating the hose assembly of FIG. 5 to be coupled to a different coupling structure than the coupling structure illustrated in FIG. 5.

If desired, the coupling structure 24E in FIG. 8 can be utilized to couple to an outer hose 32E of this invention wherein the outer hose 32E has the parts thereof that are similar to the parts of the other outer hoses 32, 32A, 32B, 32C and 32D of this invention given the same reference numeral followed by the reference letter "E".

As previously stated, the coupling structure 24E is of the type set forth in the aforementioned U.S. patent to Sanders et al, U.S. Pat. No. 5,129,686 and need not be further described except that it can be seen that a swivel 60 on the outer end thereof has external threads 61 for coupling to the desired dispensing nozzle construction or fuel pump means and an intermediate member 61' thereof has a recess means 62 therein for receiving the spider 51 therein for the purpose previously set forth.

The outer hose 32E of the hose assembly 20E is identical to the outer hose 32C previously described except that the cuff 44E is only secured to the internal peripheral surface means 39E thereof throughout the length of the cuff 44E so that the outer peripheral surface means 59E of the outer hose 33E engages the outer member 49'E of the coupling 24E while the internal peripheral surface 46E of the cuff 44E is engaged by the inner member 49E of the coupling 24E to fasten the cuffed end of the outer hose 32E between the members 49E and 49'E in any of the manners set forth in the patent to Sanders et al, U.S. Pat. No. 5,129,686. In fact, it may be found that a cuff need not be provided for the end of the hose 32E and the same can look similar to the hose 32D of FIG. 11 as the member 49E can carry a corrugated member or itself be corrugated in the same manner as set forth in the aforementioned patent to Sanders et al, U.S. Pat. No. 5,129,686.

In any event, it can be seen that the outer hoses 32C, 32D and 32E of this invention can readily have the volatile liquid fuel disposed against the same and the inner corrugated member 33C, 33D or 33E thereof can be formed of the two layers 41 and 42 in the manner illustrated in FIG. 9, if desired, or the outer hoses 32C, 32D and 32E can have the returning vapors of such volatile liquid disposed against the same as desired.

Therefore, it can be seen that this invention provides a new hose assembly and a new method of making such a hose assembly.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a hose assembly having opposite ends and having a first fluid passage therein for conveying a volatile liquid fuel in one direction from one of said ends thereof to a container adjacent the other of said ends thereof and a second fluid passage therein for returning the vapors of the volatile liquid fuel from the container to said one end thereof, the assembly comprising a flexible inner hose having an outer peripheral surface and defining one of said fluid passages therein, and a flexible outer hose having an inner peripheral surface and an outer peripheral surface and being disposed around said inner hose, said inner peripheral surface of said outer hose and said outer peripheral surface of said inner hose defining the other of said fluid passages therebetween, said outer hose comprising a corrugated tube that has the corrugations thereof extending throughout the entire length thereof, the improvement wherein said outer peripheral surface of said outer hose comprises a substantially straight line tubular layer of polymeric material secured to said corrugations of said corrugated tube throughout the entire length thereof, wherein said inner peripheral surface of said outer hose comprises said corrugated tube and wherein said inner peripheral surface of said outer hose and said outer peripheral surface of said inner hose define said first fluid passage.

2. A hose assembly as set forth in claim 1 and comprising a cuff secured to one of said ends of said outer hose.

3. A hose assembly as set forth in claim 2 wherein said cuff covers said outer peripheral surface and said inner peripheral surface of said outer hose throughout the entire length of said cuff.

4. A hose assembly as set forth in claim 2 wherein said cuff covers only said inner peripheral surface of said outer hose throughout the entire length of said cuff.

5. A hose assembly as set forth in claim 1 wherein said corrugations of said corrugated tube are helically disposed.

6. A hose assembly as set forth in claim 1 wherein said corrugations of said corrugated tube are annular.

7. A hose assembly as set forth in claim 1 wherein said tubular layer of polymeric material comprises two initially separate layers of polymeric material secured together.

8. A hose assembly as set forth in claim 7 wherein said tubular layer of polymeric material has a tubular layer of reinforcement material disposed between said two initially separate layers of polymeric material.

* * * * *